United States Patent
Nuzzio

(10) Patent No.: US 6,298,181 B1
(45) Date of Patent: Oct. 2, 2001

(54) OPTICAL FIBER SWITCHING ARRANGEMENT

(75) Inventor: Donald B. Nuzzio, Ringoes, NJ (US)

(73) Assignee: Analytical Instruments Systems, Inc., Flemington, NJ (US)

(*) Notice: Subject to any disclaimer, the term of this patent is extended or adjusted under 35 U.S.C. 154(b) by 0 days.

(21) Appl. No.: 09/378,024

(22) Filed: Aug. 20, 1999

Related U.S. Application Data

(60) Provisional application No. 60/097,493, filed on Aug. 21, 1998.

(51) Int. Cl.[7] .................................. G02B 6/26; G02B 6/42
(52) U.S. Cl. .................................... 385/16; 385/20; 385/24
(58) Field of Search ........................... 385/16–24, 33; 359/110, 128, 152, 173, 177; 356/462; 349/196; 370/316, 380; 250/227.11; 700/17

(56) References Cited

U.S. PATENT DOCUMENTS 5,960,134 * 9/1999 Sakamoto et al. .................. 385/20

* cited by examiner

Primary Examiner—Phan T. H. Palmer
(74) Attorney, Agent, or Firm—Rohm & Monsanto, PLC

(57) ABSTRACT

A switching arrangement for optical fibers is provided with a plurality of first optical fibers and a plurality of second optical fibers. A photoemitter element is arranged to communicate optically with a selectable one of the plurality of first optical fibers, and a photodetector element communicates optically with a selectable one of the plurality of second optical fibers. A communications arrangement enables optical communication between the photoemitter and photodetector elements, and respectively selected ones of the first and second optical fibers simultaneously. The communications arrangement has a displaceable portion and a stationary portion. A drive arrangement is coupled to the displaceable portion of the communications arrangement. A controller is coupled to the drive arrangement for controlling a displacement of the displaceable portion of the communications arrangement. Displacement is effected along a linear path, or in other embodiments, along a circular path.

19 Claims, 6 Drawing Sheets

OPTICAL FIBER SWITCHING ARRANGEMENT

RELATIONSHIP TO OTHER APPLICATION

This application claims the benefit of U.S. Provisional Application No. 60/097,493 filed Aug. 21, 1998.

BACKGROUND OF THE INVENTION

1. Field of the Invention

This invention relates generally to spectroscopic studies such as those performed in the practice of dissolution technology, and more particularly, to a mechanical switching arrangement that permits a plurality of optical fiber source light and data channels to be switched.

2. Description of the Prior Art

The processing of optical signals during performance of spectroscopic studies of multiple samples using a single analyzer has required manual switching of source and detector light conduits from sample-to-sample. There is a need for a simple and inexpensive arrangement for effecting such switching automatically.

SUMMARY OF THE INVENTION

A switching arrangement for optical fibers is provided with a plurality of optical fibers and a photoelectric element for communicating optically with selectable ones of said plurality of optical fibers. A communications arrangement for enables optical communication between the photoelectric element and a selected one of the plurality of optical fibers. Additionally, a controller is provided for controlling the communications arrangement.

In one embodiment of the invention, the communications arrangement is provided with a displaceable carrier for displacing a selected one of the plurality of optical fibers and the photoelectric element. The displaceable carrier is responsive to the controller and displaces the plurality of optical fibers, whereby a selected one of the optical fibers is translated to the vicinity of the photoelectric element for establishing optical communication therewith, in response to the controller. In a practicable embodiment of the invention, the translation of the displaceable carrier is along a circular path. In other embodiments, however, the translation of the displaceable carrier is along a linear path. The translation of the displaceable carrier is responsive to indicia on the carrier, or to data of location stored in the controller, or to communication optimization, whereby fine tuning of the displacement of the carrier is achieved.

In accordance with a further aspect of the invention, a switching arrangement is provided for optical fibers. A plurality of first optical fibers, and a plurality of second optical fibers are provided. A photoemitter element is arranged to communicate optically with selectable ones of the plurality of first optical fibers, and a photodetector element communicates optically with selectable ones of the plurality of second optical fibers. There is additionally provided a communications arrangement for enabling optical communication between the photoemitter ;ad photodetector elements, and respectively selected ones of the first and second optical fibers simultaneously. A controller controls the displacement of the communications arrangement.

In one embodiment of this further aspect of the invention, the controller controls a rotational displacement of the communications arrangement. The plurality of first optical fibers is arranged in substantially semicircular configuration, the plurality of second optical fibers being arranged in substantially semicircular configuration, in diametrical opposition to the plurality of first optical fibers. Preferably, the pluralities of first and second optical fibers are arranged in individually corresponding diametrical opposition with respect to corresponding optical fibers of each of the pluralities.

In a further embodiment, the communications arrangement is provided with a rotatable mirror. Preferably, the rotatable mirror is a dual-sided rotatable mirror.

The communications arrangement controls, in one embodiment, a linear displacement of the communications arrangement. In this embodiment, the plurality of first optical fibers is arranged linearly parallel to the plurality of second optical fibers. The communications arrangement is provided with a rotatable screw shaft that is rotated to effect the linear displacement.

In accordance with a further aspect of the invention, there is provided a switching arrangement for optical fibers. A plurality of first optical fibers and a plurality of second optical fibers are provided. A photoemitter element is arranged to communicate optically with a selectable one of the plurality of first optical fibers, and a photodetector element communicates optically with a selectable one of the plurality of second optical fibers. A communications arrangement enables optical communication between the photoemitter and photodetector elements, and respectively selected ones of the first and second optical fibers simultaneously. The communications arrangement has a displaceable portion and a stationary portion. A drive arrangement is coupled to the displaceable portion of the communications arrangement. A controller is coupled to the drive arrangement for controlling a displacement of the displaceable portion of the communications arrangement.

BRIEF DESCRIPTION OF THE DRAWING

Comprehension of the invention is facilitated by reading the following detailed description, in conjunction with the annexed drawing, in which.

DETAILED DESCRIPTION

Figure 1:
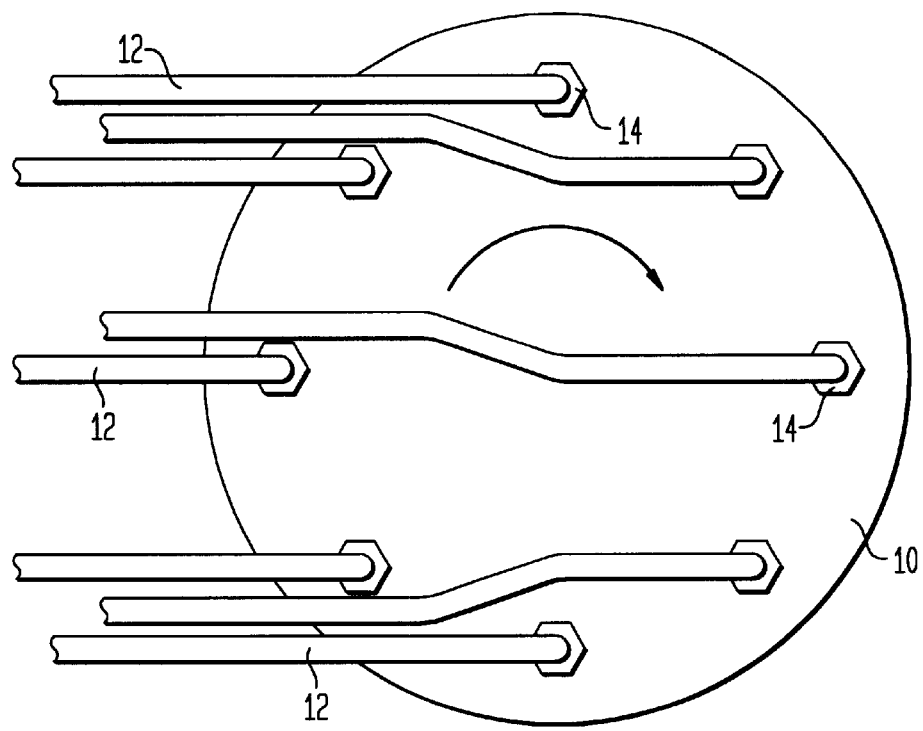
FIG. 1 is a simplified schematic plan representation of an arrangement where multiple optical fibers are connected to a rotatable wheel.

FIG. 1 is a simplified schematic representation of switching wheel 10 that is rotatable, as will be described below. In this embodiment, eight optical fibers 12 are connected by respective ones of connectors 14 to apertures (not shown in this figure) of switching wheel 10.

Figure 2:
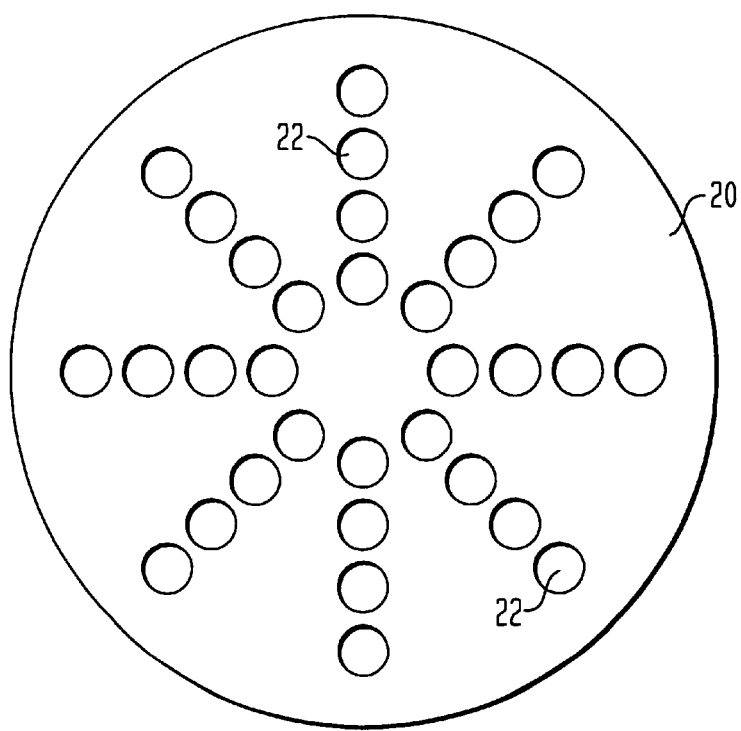
FIG. 2 is a further embodiment of a rotatable wheel, having greater adaptability than that of FIG. 1.

FIG. 2 is a plan view of an alternative embodiment of a switching wheel, designated 20 in the figure. Switching wheel 20 is shown to have a plurality of apertures therethrough for accommodating optical fibers and connectors (not shown in this figure) as shown in FIG. 1.

Figure 3:
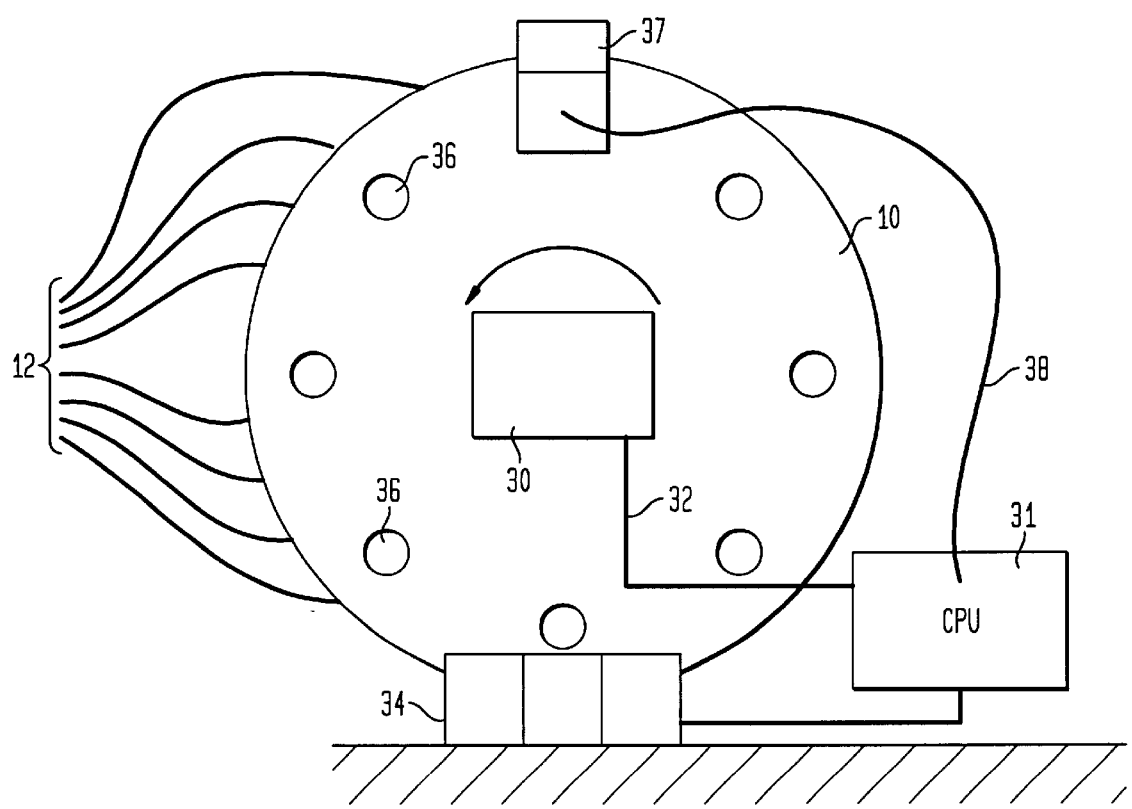
FIG. 3 is a schematic and function block representation of a control arrangement for use in the practice of the invention.

FIG. 3 is a simplified schematic and function block representation of the back side of switching wheel 10, further showing a motor 30 for rotating switching wheel 10. Motor 30 is controlled by a central processor, i.e., CPU 31, via a control cable 32. Motor 30 may be of the stepping type which affords precise angular placement. In some embodiments of the invention, however, very precise rotational positioning of switching wheel 10 is achieved by the use of a code reader 34 that reads position data or a position marker (not shown) on the periphery of switching wheel 10 and transmits such position information to CPU 31. When wheel 10 is positioned precisely so that one of apertures 36, with a correspondingly associated one of optical fibers 12 therein, is in registration with a detector 37. In some embodiments, detector 37 merely transmits the light that is received from the respectively associated optical fiber 12 to CPU 31 via a further optical fiber 38. One or more algorithms can be installed in CPU 31 to achieve precise "fine tuning" of the rotational position of switching wheel 10 in response to any combination of the stepping characteristic of motor 30, code reader 34, and optimization of the light propagated along optical fiber 38.

Figure 4:
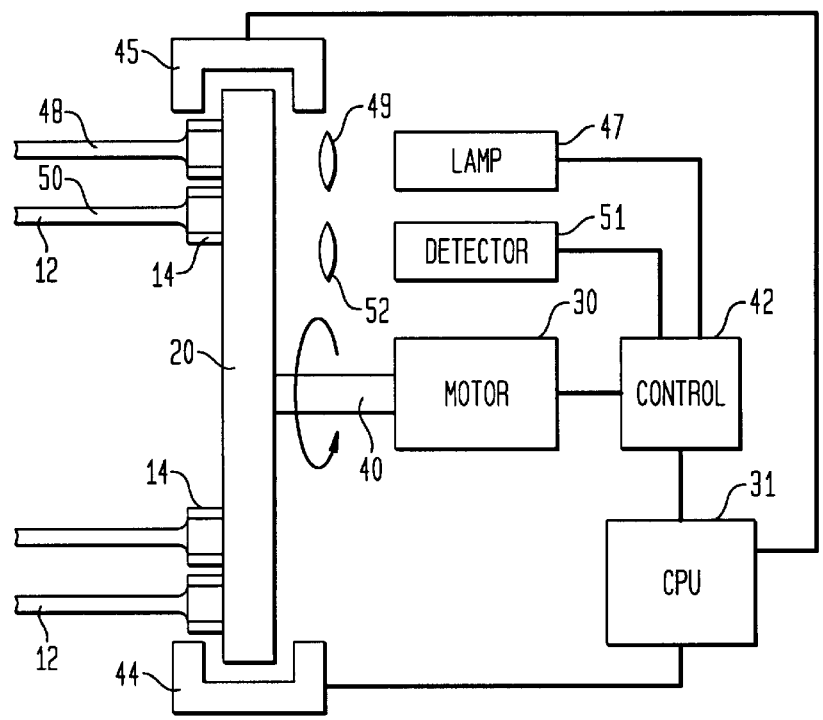
FIG. 4 is a simplified schematic and function block representation of a specific embodiment of the invention.

FIG. 4 is a partially schematic and function block representation of a further embodiment of the invention. Elements of structure that previously have been discussed are similarly designated. In this embodiment, the switching wheel is of the type shown in FIG. 2 having apertures for engaging connecters, such as connectors 14 that couple to optical fibers 12 at respective radial distances.

As shown, motor 30 is coupled mechanically to switching wheel 20 by a motor shaft 40. In this embodiment, angular positioning of switching wheel 20 is controlled by CPU 31 and a controller 42 that controls the operation of motor 30. Control information is responsive to code readers 44 and 45 that read angular position information from the switching wheel.

Once switching wheel 20 has been positioned properly, a light source or lamp 47 emits an electromagnetic energy to one of optical fibers 12, such as optical fiber 48 via and optical element 49, which may be a lens. Returned light is received from an optical fiber 50 at a detector 51 via further optical element 52. As shown in this figure, lamp 47 and detector 51 are coupled to controller 42.

Figure 5:
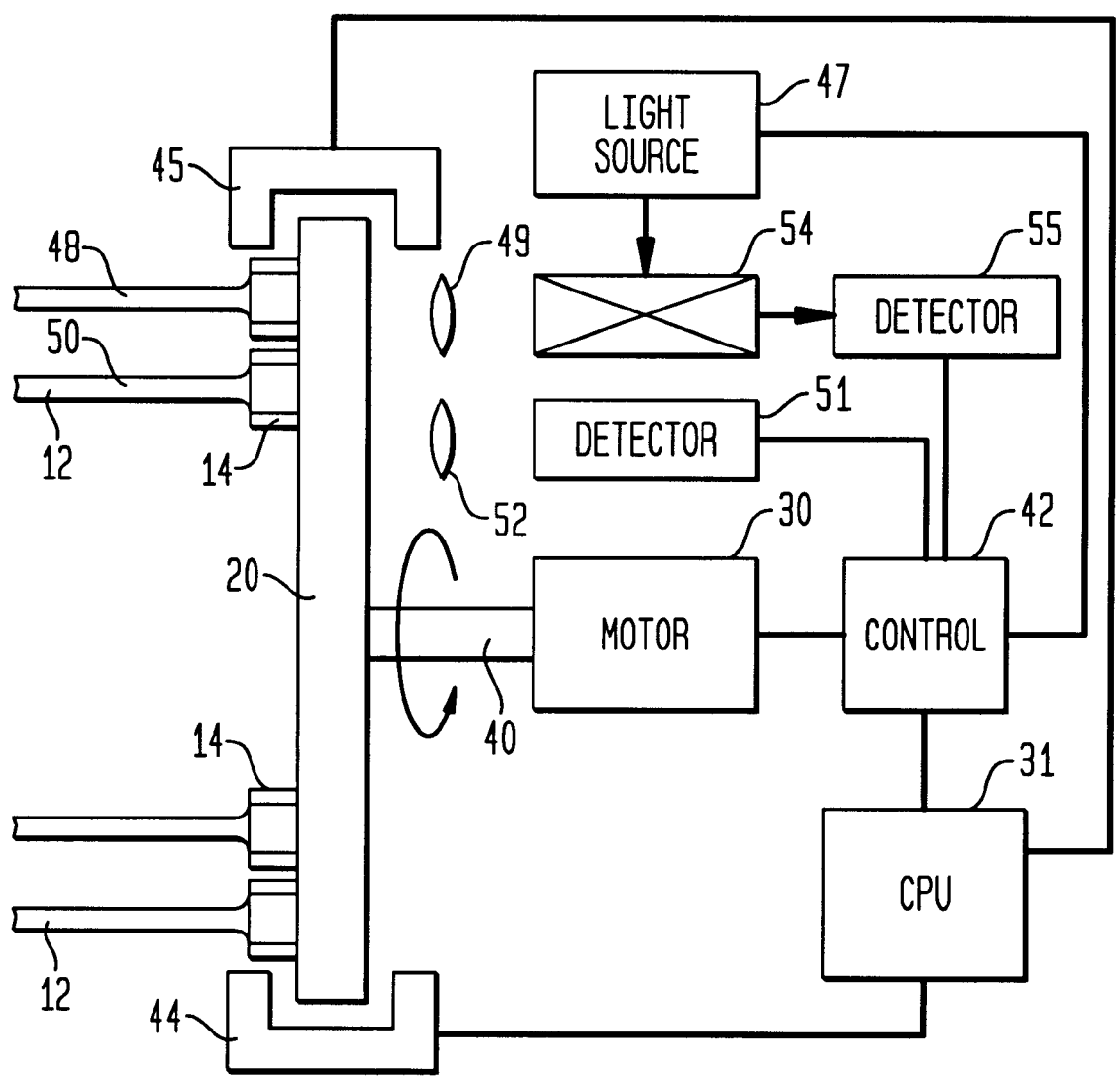
FIG. 5 is a simplified schematic and function block representation of an alternative embodiment to that of FIG. 4.

FIG. 5 is a simplified schematic and function block representation of an alternative embodiment of the invention that is similar to that shown in FIG. 4. Structural elements that have previously been discussed are similarly designated.

Light source 47 directs its electromagnetic energy to t beam splitter 54. In this specific illustrative embodiment of the invention, beam splitter 54 directs the electromagnetic energy to optical element 49, as previously discussed hereinabove with respect to lamp 47 in FIG. 4. However, in the embodiment of FIG. 5, beam splitter 54 also directs electromagnetic energy to a detector 55 that is coupled to controller 42. The connection between detector 55 and controller 42 therefore can serve as a reference channel that would facilitate comparison of the characteristics of the electromagnetic energy issued by light source 47 against that which is received via optical fiber 50 and detector 51. Such characteristics of the electromagnetic energy include chromatic differences as well as amplitude differences. Additionally, the information provided by detector 55 is useful to effect correction and normalization that will be required due to aging of light source 47.

Figure 6:
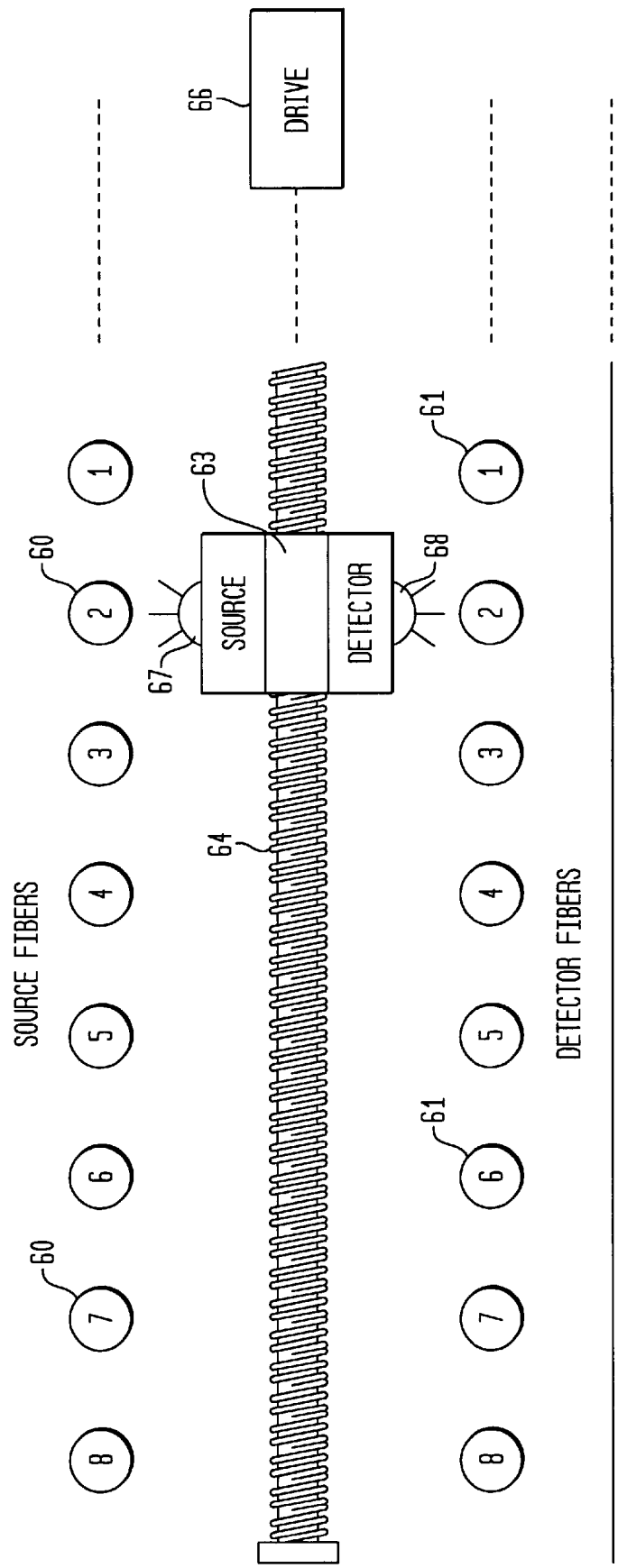
FIG. 6 is a simplified schematic and function block representation of an alternative embodiment where the source and detector fibers are stationary and the source and detector elements are displaced along a predetermined linear path.

FIG. 6 is a simplified schematic and function block representation of an alternative embodiment where the source and detector fibers are stationary and the source and detector elements are displaced along a predetermined linear path. As shown in this figure, eight source fibers 60, numbered 1 through 8, are shown in cross-section, as are eight detector fibers 61, also numbered 1 through 8. A source/detector shuttle 63 is arranged to be displaceable linearly along a screw shaft 64 that is rotated by a drive 66. As source/detector shuttle 63 is displaced along screw shaft 64, a source photodiode 67 and a photodetector 68 are disposed in the vicinity of respective, similarly numbered ones of the source and detector fibers.

Drive 66 is controlled in response to signals received from a controller (not shown in this figure). The control over placement of source/detector shuttle 63 along screw shaft 64 can be achieved in a known manner, such as in response to stored location information, or the quality of optical communication with the detector fibers (i.e., optimized light transmission, as noted hereinabove).

Figure 7:
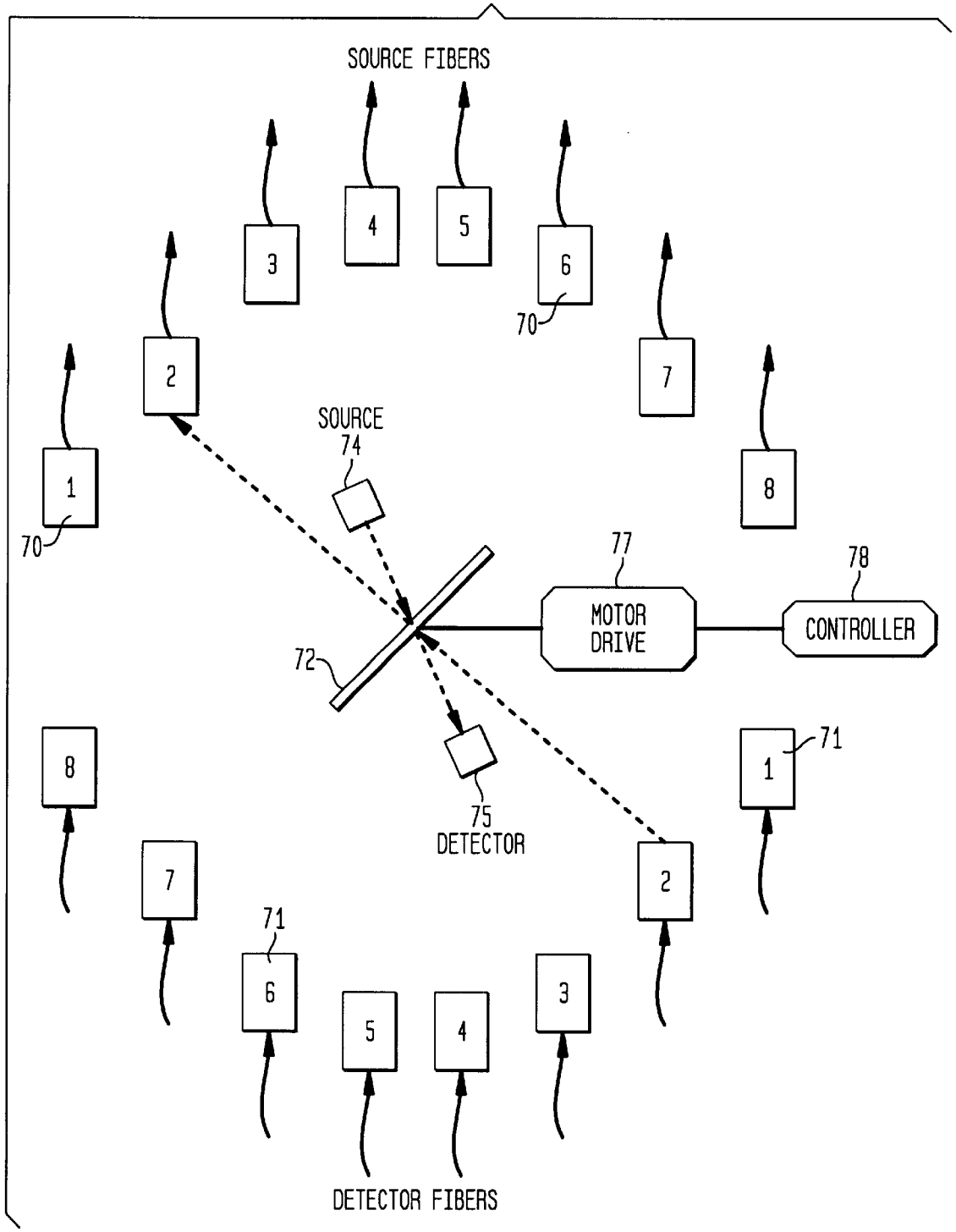
FIG. 7 is a simplified schematic and function block representation of an alternative embodiment where the source and detector fibers, as well as the source and detector elements, are stationary, and a double-sided mirror is rotated to effect optical communication between the source and detector elements and the source and detector fibers.

FIG. 7 is a simplified schematic and function block representation of an alternative embodiment where source elements 70 and detector elements 71 are stationary, and a double-sided mirror 72 is rotated to effect optical communication between a source photodiode 74 and a photodetector 75. Rotation of double-sided mirror 72 is effected by a motor drive 77 that is responsive to a controller 78. As double-sided mirror 72 is rotated, optical communication is achieved between source photodiode 74 and photodetector 75, and respective, similarly numbered ones of source elements 70 and detector elements 71.

Figure 8:
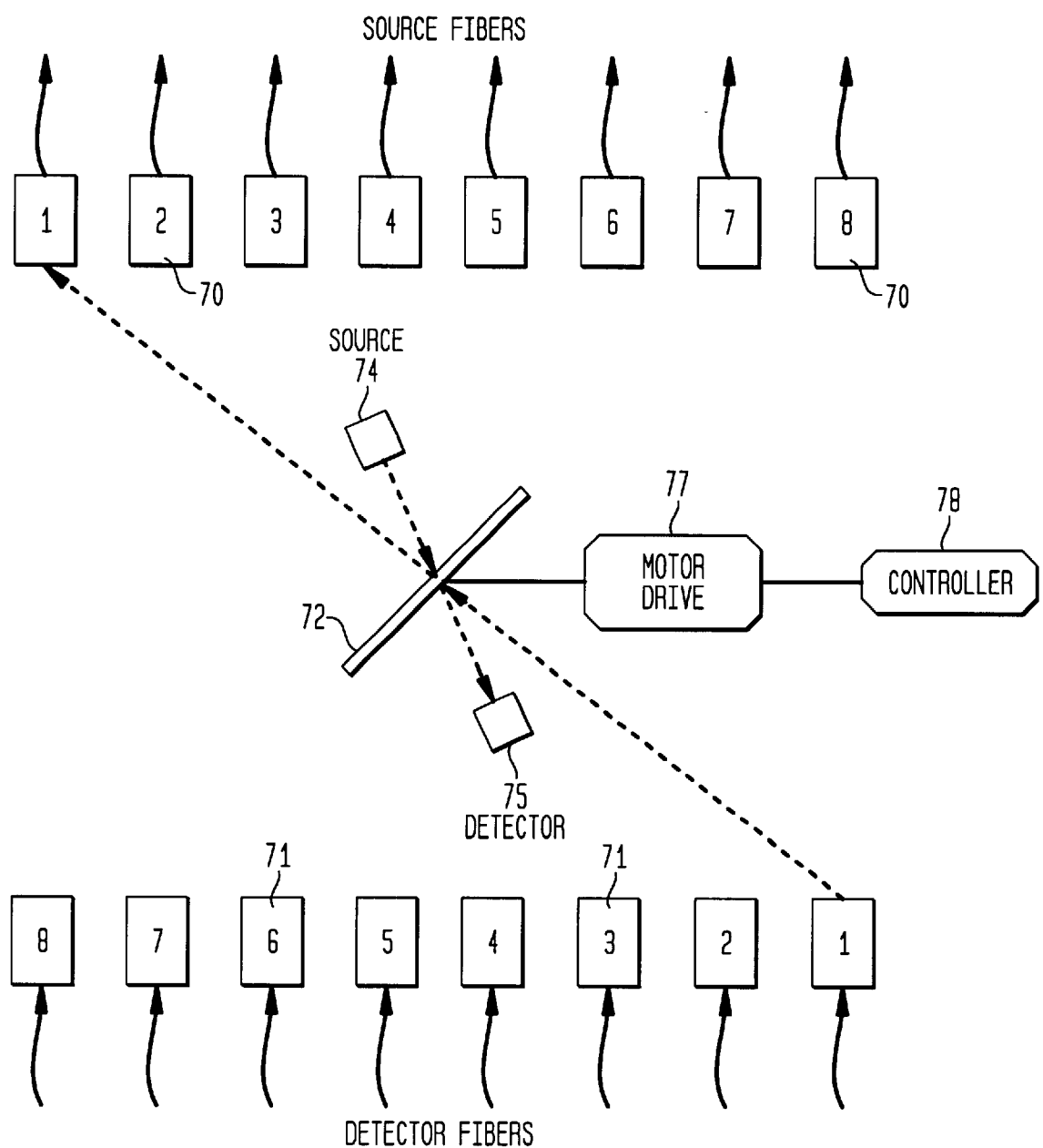
FIG. 8 is a simplified schematic and function block representation of an alternative embodiment that is similar to that of FIG. 7, except that the source and detector elements are arranged linearly parallel to each other in respective rows.

FIG. 8 is a simplified schematic and function block representation of an alternative embodiment that is similar to that of FIG. 7, except that the source and detector elements are arranged linearly parallel to each other in respective rows. Elements of structure that are analogous to those previously described are similarly designated Although the invention has been described in terms of specific embodiments and applications, persons skilled in the art can, in light of this teaching, generate additional embodiments without exceeding the scope or departing from the spirit of the disclosed invention. Accordingly, it is to be understood that the drawing and description in this disclosure are proffered to facilitate comprehension of the invention, and should not be construed to limit the scope thereof.

What is claimed is:

1. A switching arrangement for optical fibers, the arrangement comprising:
   a plurality of optical fibers;
   a photoelectric element for communicating optically with selectable ones of said plurality of optical fibers;
   a communications arrangement for enabling optical communication between said photoelectric element and a selected one of said plurality of optical fibers, said communications arrangement having a displaceable carrier for displacing said plurality of optical fibers; and a controller for controlling said communications arrangement.

2. The switching arrangement of claim 1, wherein a selected one of said optical fibers is translated by the displaceable carrier to the vicinity of said photoelectric element for establishing optical communication therewith, in response to said controller.

3. The switching arrangement of claim 2, wherein the translation of said displaceable carrier is responsive to data of location stored in said controller.

4. The switching arrangement of claim 2, wherein the translation of said displaceable carrier is responsive to communication optimization.

5. The switching arrangement of claim 2, wherein the translation of said displaceable carrier is along a circular path.

6. The switching arrangement of claim 2, wherein the translation of said displaceable carrier is along a linear path.

7. The switching arrangement of claim 2, wherein the translation of said displaceable carrier is responsive to indicia on the carrier.

8. The switching arrangement of claim 1, wherein said controller controls the displacement of the displaceable carrier.

9. A switching arrangement for optical fibers, the arrangement comprising:

a plurality of first optical fibers;

a plurality of second optical fibers;

a photoemitter element for communicating optically with a selectable one of said plurality of first optical fibers;

a photodetector element for communicating optically with a selectable one of said plurality of second optical fibers;

a communications arrangement for enabling optical communication between said photoemitter and photodetector elements, and respectively selected ones of said first and second optical fibers simultaneously, said communications arrangement having a displaceable portion and a stationary portion;

a drive arrangement coupled to the displaceable portion of said communications arrangement; and a controller coupled to said drive arrangement for controlling a displacement of the displaceable portion of said communications arrangement.

10. A switching arrangement for optical fibers, the arrangement comprising:

a plurality of first optical fibers;

a plurality of second optical fibers;

a photoemitter element for communicating optically with selectable ones of said plurality of first optical fibers;

a photodetector element for communicating optically with selectable ones of said plurality of second optical fibers;

a communications arrangement for enabling optical communication between said photoemitter and photodetector elements, and respectively selected ones of said first and second optical fibers simultaneously; and a controller for controlling a displacement of said communications arrangement.

11. The switching arrangement of claim 10, wherein said controller controls a rotational displacement of said communications arrangement.

12. The switching arrangement of claim 11, wherein said plurality of first optical fibers is arranged in substantially semicircular configuration.

13. The switching arrangement of claim 12, wherein said plurality of second optical fibers is arranged in substantially semicircular configuration, in diametrical opposition to said plurality of first optical fibers.

14. The switching arrangement of claim 13, wherein said pluralities of first and second optical fibers are arranged in individually corresponding diametrical opposition with respect to corresponding optical fibers of each of said pluralities.

15. The switching arrangement of claim 11, wherein said communications arrangement comprises a rotatable mirror.

16. The switching arrangement of claim 15, wherein said rotatable mirror is a dual-sided rotatable mirror.

17. The switching arrangement of claim 10, wherein said communications arrangement controls a linear displacement of said communications arrangement.

18. The switching arrangement of claim 17, wherein said plurality of first optical fibers is arranged linearly parallel to said plurality of second optical fibers.

19. The switching arrangement of claim 17, wherein said communications arrangement comprises a rotatable screw shaft.

* * * * *